United States Patent [19]

O'Brien

[11] 4,090,396
[45] May 23, 1978

[54] METHOD AND DEVICE FOR DETECTING HYDRAULIC LEAKS

[76] Inventor: John W. O'Brien, 607 S. Kelly St., Harrison, Ark. 72601

[21] Appl. No.: 763,899

[22] Filed: Jan. 31, 1977

[51] Int. Cl.² .............................................. G01M 3/28
[52] U.S. Cl. ......................................................... 73/46
[58] Field of Search ........................ 73/40, 46, 47, 49.8, 73/168

[56] References Cited

U.S. PATENT DOCUMENTS

| | | | |
|---|---|---|---|
| 3,100,392 | 8/1963 | Skinner | 73/46 |
| 3,233,447 | 2/1966 | Horrell | 73/46 |
| 3,389,600 | 6/1968 | Rau | 73/168 |

Primary Examiner—S. Clement Swisher
Attorney, Agent, or Firm—Lowe, Kokjer, Kircher, Wharton & Bowman

[57] ABSTRACT

To detect fluid leakage in a hydraulic directional control valve, a plate is installed between the valve and its mounting subplate. Passages through the plate connect with the pressure inlet and tank ports of the valve, while the load ports of the valve are blocked by the plate. Leaking fluid flows out of the tank port and passes through an orifice across which a pressure differential develops in proportion to the leakage rate. The pressure differential is applied to a piston which retracts an indicator knob within the plate when an unacceptable leakage rate is present. A modified form of the invention detects the combined leakage rate in the valve and the load which it controls. Rather than blocking the load ports, the modified plate has passages which connect with the load ports of the valve to deliver fluid to the load. An orifice is located in the passage of the plate which connects with the pressure inlet port of the valve. When the load is held at its travel limit, fluid leakage in the valve or load creates a pressure differential across the orifice to effect movement of the piston and retraction of the indicator knob.

20 Claims, 10 Drawing Figures

METHOD AND DEVICE FOR DETECTING HYDRAULIC LEAKS

BACKGROUND AND SUMMARY OF THE INVENTION

This invention relates generally to the detection of fluid leaks and more particularly to a method and device for detecting leaks in hydraulic directional control valves and the loads which they control.

Directional control valves are widely used to regulate the fluid flow to and from hydraulically powered machinery such as power cylinders, hydraulic motors, hydraulic presses and the like. After extensive use, the valves become worn and develop internal leaks which add significantly to the power requirements of the hydraulic system. Moreover, if such leaks go undetected, they eventually cause the valve to fail completely such that the machine must be shut down for emergency repairs at a possibly inopportune time. Accordingly, it is desirable for the valves to be inspected periodically, as during routine maintenance checks.

At present, however, the detection of leaks in directional control valves is a difficult and time-consuming task which is carried out most commonly by checking them on a test stand. The use of a test stand requires that the valves be completely removed from the hydraulic circuit in which they are included. Usually, electrical disconnections must be made in addition to the mechanical disconnections since most valves are operated electrically. The testing is then carried out and the valve is reinstalled in its operating position. As can be appreciated, the procedure involved in using the test stand is so complicated that it is not practical to check the valves as often as would be desirable.

Furthermore, the test stands are costly items and their accuracy is often lacking, primarily because it is nearly impossible to duplicate for testing purposes the conditions under which the valve actually operates. For example, if the valve is tested at a pressure greater than that encountered during normal operation and is found to leak excessively, it still may function adequately under its normal low pressure conditions. Thus the test may be invalid. Conversely, if the valve is tested at low pressure and found not to leak significantly, the test may again be invalid because the valve may leak excessively if its normal use is in a high pressure line. Other possible variations (such as in flow rate or temperature) between the test conditions and the actual operating conditions increase the likelihood of obtaining invalid results from the conventional testing procedure.

A similar problem is encountered with respect to fluid leakage from the loads which are controlled by hydraulic directional control valves. As an example, if a hydraulic motor or cylinder should leak, the power requirements of the system are substantially increased and the machine will eventually fail to operate properly. Accordingly, it is desirable to periodically check for leakage in the load as well as in the valve.

It is the primary goal of the present invention to meet the need for a simple and economical method of checking for fluid leakage, both in hydraulic directional control valves and loads under their actual operating conditions.

Another object of the invention is to provide a leak detection device of the character described in which the leaking fluid creates a pressure differential that is used to indicate the rate of leakage.

Still another object of the invention is to provide a device of the character described which utilizes the pressure differential to retract an indicator member in proportion to the leakage rate.

A further object of the invention is to provide a device of the character described wherein the indicator is a stepped member that can be felt with the fingers in order to determine the extent of its retraction in situations where visual observation is difficult or impossible.

An additional object of the invention is to provide a device of the character described that includes interchangeable orificed members which present orifices or varying effective size. Accordingly, the pressure differential caused by the leaking fluid can be made to correspond with the maximum leakage rate that is deemed acceptable for the particular hydraulic circuit and equipment involved.

Yet another object of the invention is to provide a device of the character described which includes means for preventing excessive pressure buildup, as when a large leak is present in the valve or load.

A still further object of the invention is to provide a leak detection method which can be carried out quickly and accurately.

Other and further objects of the invention, together with the features of novelty appurtenant thereto, will appear in the course of the following description.

DETAILED DESCRIPTION OF THE INVENTION

In the accompanying drawings, which form a part of the specification and are to be read in conjunction therewith, and in which like reference numerals are employed to indicate like parts in the various views.

Figure 1:
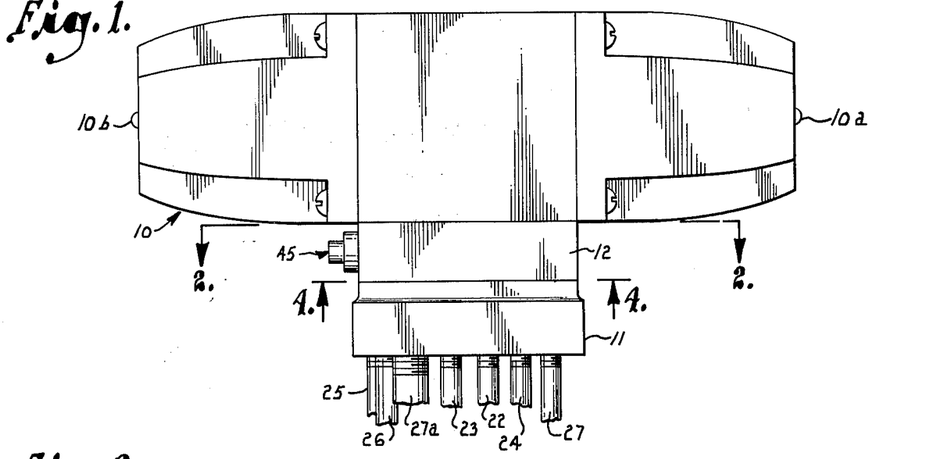
FIG. 1 is an elevational view illustrating a leak detection device constructed according to a first embodiment of the present invention installed between a directional control valve and a mounting subplate.

Referring now to the drawings in detail and initially to FIG. 1, reference numeral 10 designates a typical hydraulic directional control valve which in normal use is mounted directly on top of a mounting subplate 11. However, in accordance with the present invention and as shown in FIG. 1, a housing in the form of a plate 12 is installed between valve 10 and subplate 11.

The directional control valve 10 operates in a conventional manner to direct fluid to and from a load (not shown) which is controlled by the valve. On its underside, the valve has the usual pressure inlet port P which is indicated in broken lines in FIG. 4 and which serves as a supply port by which pressurized fluid enters the valve. With continued reference to FIG. 4, the valve has load ports A and B which direct fluid from the valve to the load, and from the load back to the valve. A tank port T (FIGS. 3, 5 and 6) provides an outlet from the valve through which fluid is able to return to the fluid reservoir (not shown). Ports W, X and Y (FIG. 4) are sometimes provided in valves which are controlled by a pilot valve, with ports X and Y serving to supply the pilot valve and port W providing a drain port for the pilot valve. However, ports W, X and Y are usually not necessary since the pilot valve can often utilize ports P and T for its pressure and drain requirements.

Valve 10 has the usual valve spool (not shown) which is shifted between various positions in order to selectively connect and disconnect the valve ports according to the desired fluid path to and from the load. The valve spool is usually controlled electrically, although it has override buttons 10a and 10b by which it may be mechanically shifted between its various positions. The details of the valve and its manner of operation are well known to those having skill in the art.

The subplate 11 is provided with various passages which correspond with the valve ports. As shown in broken lines in FIG. 2, a passage 14 is formed through plate 11 at a location corresponding with the pressure inlet port P of the valve. Passages 15 and 16 are formed through plate 11 to correspond with the load ports A and B, respectively, while passages 17, 18 and 19 correspond with ports W, X and Y, respectively. The subplate also has a passage 20 (see FIGS. 3, 5 and 6) which corresponds with the tank port T of the valve 10. Each valve port is counterbored and provided with an o-ring seal, as exemplified at 21 in FIGS. 3, 5 and 6.

The hydraulic fluid moves through various hydraulic lines which connect with plate 11. An inlet line 22 leads from a source of hydraulic fluid to connect with the pressure inlet passage 14 of the subplate. Lines 23 and 24 extend to the load from passages 15 and 16. If valve 10 is a slave valve controlled by a pilot valve, lines 25, 26 and 27 connect to passages 17, 18 and 19, respectively, with line 25 serving as a drain line for pressure-centered valves, line 26 serving to supply hydraulic pressure from a separate source to the pilot valve through a line extending through the slave valve, and line 27 connecting to a separate tank line to provide the pilot valve with a separate drain. Each line 25, 26 and 27 is thus for a special connection, and all of these lines can be checked for leakage by testing the pilot valve. Line 27a leads from the tank passage 19 to the fluid reservoir (not shown).

Figure 2:
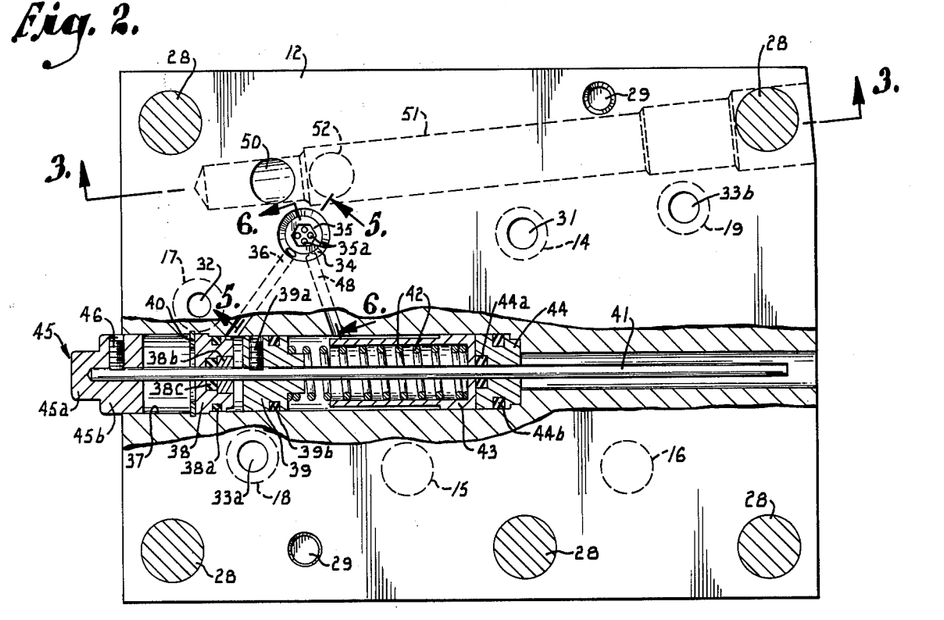
FIG. 2 is a top plan view of the device taken on an enlarged scale generally along line 2—2 of FIG. 1 in the direction of the arrows, with portions shown in cross section and the broken lines illustrating internal details.

As previously indicated, the present invention includes plate 12, which is installed between valve 10 and the mounting subplate 11. With reference to FIG. 2 in particular, bolts 28 extend through plates 11 and 12 and into valve 10 in order to tightly sandwich plate 12 between the valve and subplate. The top surface of plate 12 is a smooth, flat surface which has a pair of circular recesses 29 which receive dowel pins (not shown) on the underside of valve 10 in order to assist in properly aligning the plate with the valve. The underside of plate 12 is provided with a pair of dowel pins (FIG. 4) which fit in recesses (not shown) formed in the top surface of subplate 11 to align the two plates.

Figure 4:
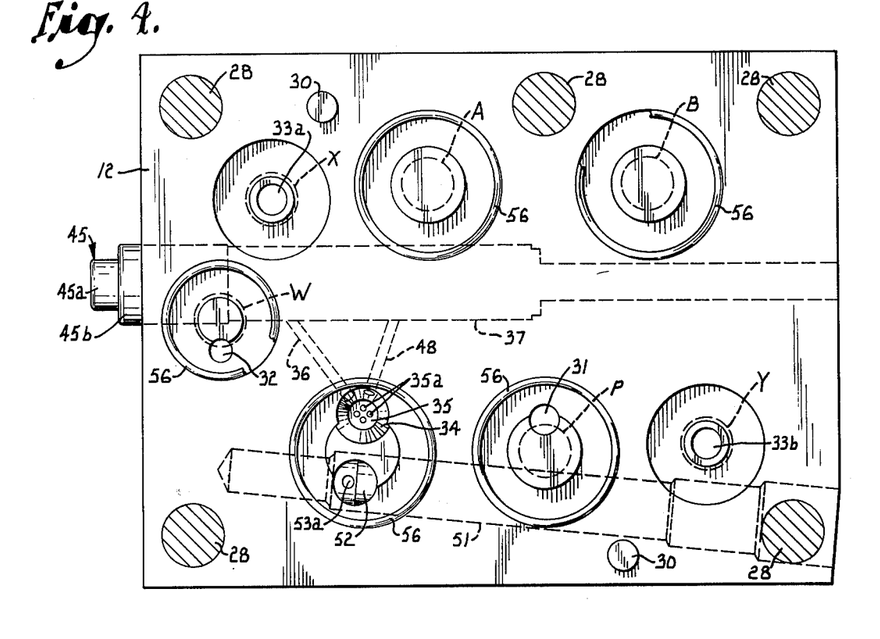
FIG. 4 is a bottom plan view of the device taken on an enlarged scale generally along line 4—4 of FIG. 1 in the direction of the arrows, with the broken lines illustrating internal details.

As best shown in FIGS. 2 and 4, a passage 31 is formed through plate 12 at a location to register with the valve port P and with passage 14 of the subplate. Another passage 32 formed through plate 12 is located to register with port W and with passage 17. Plate 12 has additional passages 33a and 33b which register with port X and passage 18, and with port Y and passage 19, respectively. Plate 12 is solid in the areas underlying ports A and B so that the load ports are completely blocked when the plate is installed against the underside of the valve.

Figure 5:
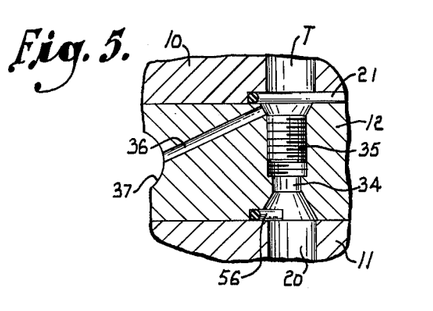
FIG. 5 is a fragmentary cross-sectional view taken generally along line 5—5 of FIG. 2 in the direction of the arrows.
Figure 6:
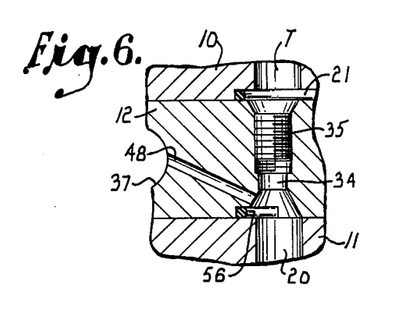
FIG. 6 is a fragmentary cross-sectional view taken generally along line 6—6 of FIG. 2 in the direction of the arrows.

With reference now to FIGS. 5 and 6 in particular, another passage 34 is formed through plate 12 at a location to extend between the tank port T and passage 20 of the subplate. Passage 34 is flared at both ends and is internally threaded in order to receive a small set screw through which one or more orifices 35a are formed (see FIGS. 2 and 4). Preferably a number of interchangeable screws 35 are provided, each with either a different sized orifice or a different number of orifices so that the effective orifice size presented is different for each screw.

FIG. 5 illustrates a small fluid passage 36 which connects with the upper end of passage 34 at a location above screw 35. Passage 36 leads at an incline to a cylindrical bore 37 which extends through plate 12 from side to side.

Referring additionally to FIG. 2, passage 36 connects with bore 37 in the area between a stationary plug 38 and a movable piston 39. Plug 38 is held firmly in place in the bore with assistance from a snap ring 40, while a seal ring 38a provides a seal between the plug and the bore walls. A rod 41 passes centrally through plug 38 and is supported to slide relative thereto within a small sleeve 38b. A seal ring 38c provides a seal between the plug and rod. Rod 41 also passes centrally through piston 39 and is secured thereto by a small set screw 39a. Piston 39 is able to slide within bore 37 and is sealed against the walls thereof by a seal ring 39b.

A spring 42 is fit around the shaft of rod 41 to act against the left end of piston 39. The opposite end of the spring is contained within a spring retainer 43 which seats against an end plug 44. Rod 41 passes centrally and slidably through plug 44 and is sealed thereto by a ring 44a, while another ring 44b seals plug 44 with the bore walls. Plug 44 seats against a shoulder which is formed at a stepped area of bore 37 where the diameter of the bore is reduced.

Rod 41 extends substantially the entire length of bore 37 and has an indicator knob 45 secured to its left end by a set screw 46. Knob 45 is formed in a stepped configuration, having an end portion 45a which is reduced in diameter as compared to the body portion 45b of the knob. The body portion 45b is substantially equal in diameter to bore 37, and approximately half of the body is located in the bore when spring 42 is in its stable, undeformed condition (FIG. 2). Thus approximately half of the body 45b and all of end portion 45a normally project out of the bore beyond the side surface of plate 12. Preferably, end portion 45a and body portion 45b are painted to contrast with one another in color. The extent to which knob 45 can be retracted is limited by engagement of piston 39 against the spring retainer 43.

Referring additionally to FIG. 6, a fluid passage 48 extends from the flared lower end of passage 34 to connect with bore 37 at location to the right of piston 39 (see FIG. 2). Passages 36 and 48 thus extend from opposite sides of screw 35 to opposite sides of piston 39, thereby translating any pressure differential that develops across the screw to a pressure differential which is applied across the piston.

Figure 3:
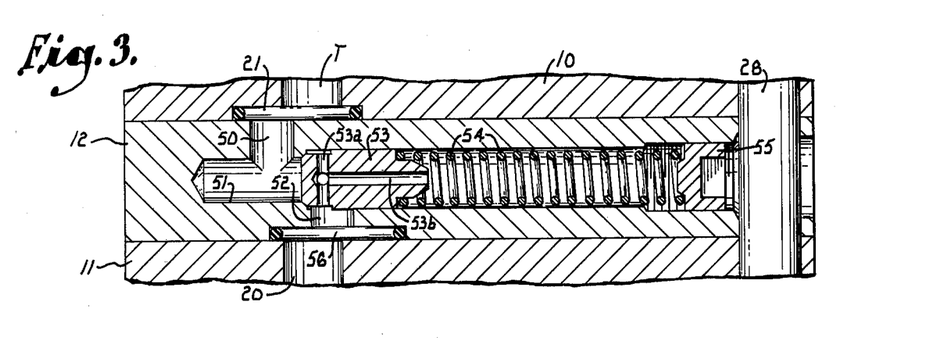
FIG. 3 is a cross-sectional view taken generally along line 3—3 of FIG. 2 in the direction of the arrows.

Referring now to FIG. 3 in particular, the counterbore area within the o-ring 21 that surrounds port T connects additionally with a passage 50 that extends into the top of plate 12. Passage 50 leads to the inner end portion of a stepped bore 51 which extends into plate 12 from one side thereof. Another passage 52 connects with bore 51 at a location offset from passage 50. Passage 52 is normally closed off from passage 50 by a relief valve 53 which is able to slide within bore 51.

Valve 53 is urged to the left by a compression spring 54 which normally maintains the valve against its seat, as shown in FIG. 3. In this position, the valve prevents fluid from flowing into passage 52 from passage 50. The opposite end of spring 54 engages a plug 55 which is threaded into bore 51. The valve 53 is provided with a first relief passage 53a which connects with passage 52 and with a second passage 53b which connects with passage 53a and leads to the area behind valve 53. Passages 53a and 53b are able to relieve any back pressure that may build up in the passage 20 which connects with the tank line 27a.

As previously indicated, valve 53 is normally maintained in its closed position by spring 54. However, when the fluid pressure in passage 50 is great enough to overcome the force of the spring, valve 53 is unseated by the fluid, which is then able to flow past the valve into passage 52, thus bypassing the orificed passage 34. The force applied to valve 53 by spring 54 may be adjusted by adjusting the position of plug 55 in bore 51. Accordingly, the valve 53 may be easily adjusted such that it will open at any desired pressure level.

As best shown in FIG. 4, counterbore areas are formed on the underside of plate 12 in the area of each passage, and each counterbore is provided with an o-ring 56 which effects a seal with the flat upper surface of subplate 11. Passages 34 and 52 both open within the o-ring 56 which forms a seal around the tank passage 20 in the subplate 11.

To install the leak detection device, plate 12 is inserted between valve 10 and subplate 11. Bolts 28 are tightened to secure the plate between the valve and subplate. O-rings 21 and 56 form tight seals between valve 10 and plate 12, and between plate 12 and subplate 11 in the areas around the fluid passages. Since the installation of plate 12 causes blocking of ports A and B, the hydraulic circuit should be checked for unsafe conditions, although none will ordinarily be present.

To test valve 10 for internal leakage, the valve spool (not shown) is shifted to all of its operating conditions, either with the electrical controls or by means of the manual override buttons 10a and 10b. With the valve spool positioned to connect port P with port A and to connect port B with port T, for example, the valve receives fluid at full pressure through line 22, passages 14 and 31, and the pressure inlet port P. Accordingly, the valve is tested at the actual pressure under which it normally operates. Plate 12 completely blocks ports A and B so that the fluid is unable to flow out of port A to the load as it normally would. Since ports A and B are blocked nd ports P and T are disconnected by the valve spool, the fluid that reaches the tank port T results from internal leakage in the valve.

The flow of leaking fluid out of tank port T creates a back pressure above screw 35 due to the orifices 35a which present restrictions in passage 34. The pressure differential which develops across screw 35 and its orifices is directly proportional to the rate of fluid leakage. The high pressure fluid flows through passage 36 and enters bore 37 at the left side of piston 39 (FIG. 2), while the low pressure fluid communicates with the right side of the piston through passage 48. Consequently, the pressure differential is applied across piston 39, and the piston is thereby caused to move to the right against the force of spring 42 a distance proportional to the fluid leakage rate. With the effective size of orifices 35a selected appropriately, this movement of the piston can be made to completely retract the indicator knob 45 into plate 12 when the fluid leakage is at the maximum acceptable rate. As the piston moves to the right, passage 48 provides a drain for the fluid that is behind the piston.

If knob 45 is fully retracted into plate 12, valve 10 is leaking at the maximum accepted level (as determined by the orifice size in the screw 35 which is selected), and the valve should be replaced as soon as possible. Conversely, if there is no movement of knob 45, the valve is not leaking to any significant extent. Movement of the knob to an intermediate position, such as with the body 45b fully retracted and the end portion 45a projecting out of the plate, indicates that there is some leakage in the valve but less than the maximum allowable. When the pressure differential across the piston is removed, spring 42 returns the piston to the normal centered position (FIG. 2).

The leakage at all positions of the valve spool can be detected in the same manner. However, if the spool has a position connecting port P directly with port T, the pressure differential that develops across screw 35 is not due to valve leakage and should be disregarded. It is noted that in this case and in cases where there is a large internal leak in the valve, the large pressure buildup at port T will cause the relief valve 53 to open, thereby allowing the fluid to bypass the orificed passage 34. Preferably, the force of spring 54 is sufficient to keep valve 53 closed until the pressure acting against the valve rises barely above the pressure level required to fully retract the indicator knob 45. A flow rate slightly greater than the maximum acceptable leakage rate will thus cause valve 53 to open and relieve the fluid pressure at port T.

Since portions 45a and 45b of the indicator knob are of contrasting colors, the leakage rate may be easily observed in most cases. In situations where the valve is in a restricted space such that observation is difficult, knob 45 can be felt with the fingers and its stepped shape provides an indication of the extent to which it is retracted. It is contemplated that the knob may have additional sections of varying size to give a more precise indication of the leakage rate if necessary.

Since a number of interchangeable set screws 35 are provided, each having one or more orifices 35a that present a different effective orifice size than the others, the leakage rate necessary to fully retract knob 45 can be varied. To develop a given pressure differential across each screw, a different flow rate is required due to the different orifice size presented by the screws. The particular screw which is installed in passage 34 will depend on the leakage which is deemed acceptable for the hydraulic circuit and equipment with which the valve is used.

As will be apparent to those having skill in the art, the leak detecting device may be easily adapted for use with valves other than those having two load ports A and B. As an example, the device can be made suitable for use with a valve that is used to control a single acting cylinder. Such valves have only a single load port which directs fluid to and from one side of the hydraulic piston, and this load port would be blocked by the indicator plate.

FIGS. 7-10 illustrate an alternative form of the invention which is used to detect leakage in a load which is controlled by a hydraulic valve. Reference numeral 112 designates a plate which, when employed to check for leakage, is sandwiched between valve 10 and subplate 11 in the same manner as the plate 12 shown in FIG. 1. Bolts 128 secure plate 112 between the valve and subplate. Dowel pins 130 project from the lower surface of plate 112 to provide assistance in aligning the plate with subplate 11.

Figure 7:
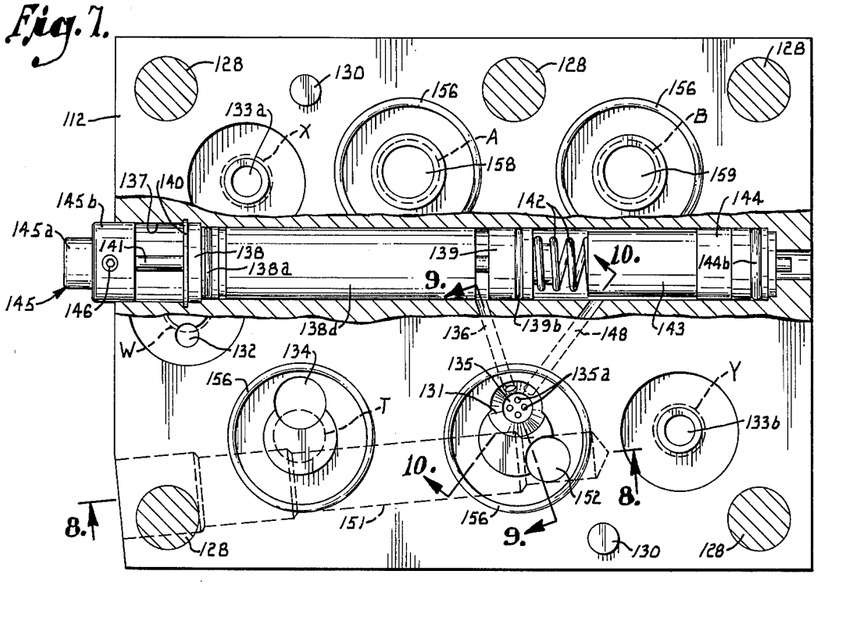
FIG. 7 is a bottom plan view of a second form of the invention which is used to detect leaks in hydraulically controlled loads, with portions shown in cross section and the broken lines illustrating internal details.

Plate 112 is constructed much like plate 12 although a greater number of fluid passages are formed through plate 112. A passage 131 extends through plate 112 at a location to register with port P of the valve and with passage 14 of the subplate (see FIGS. 9 and 10). As best shown in FIG. 7, plate 112 is further provided with passages 132, 133a, 133b and 134 which correspond respectively with the passages 32, 33a, 33b and 34 which were described in connection with plate 12. Instead of blocking ports A and B, plate 112 has passages 158 and 159 which are located to register with ports A and B, respectively. Passages 158 and 159 also connect with passages 15 and 16, respectively, of subplate 11. Fluid is thus able to move through ports A and B to and from the load which is controlled by the valve.

An o-ring 121 surrounds each valve port to provide a seal between the valve and plate 112 in the areas around the fluid passages. O-rings 156 provide a seal between plate 112 and subplate 11 in the areas surrounding the fluid passages.

Figure 9:
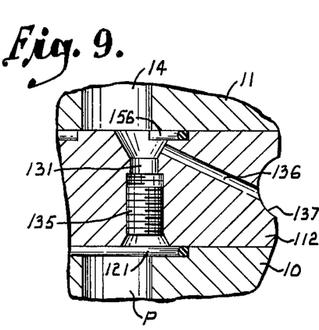
FIG. 9 is a fragmentary cross-sectional view taken generally along line 9—9 of FIG. 7 in the direction of the arrows.

A set screw 135 is threaded into the passage 131 which connects with the pressure inlet port P of the valve. There are preferably a number of interchangeable screws 135, and each screw is provided with one or more orifices 135a (FIG. 7). The effective orifice size presented by each screw differs from that of the other screws. As best shown in FIG. 9, the opposite ends of passage 131 are flared, and a small passage 136 leads from the flared end nearer the subplate 11. Passage 136 extends to connection with a bore 137 which is formed through plate 112.

Referring again to FIG. 7, passage 136 connects with the bore in the area between a slidable piston 139 and a spacer 138d which is fit within the bore and against a stationary plug 138 which is held by a snap ring 140. Piston 139 and the parts assembled thereto are similar to piston 39 and its associated parts. Piston 139 is secured to a rod 141, and a seal ring 139b forms a seal of the piston with the bore walls. Rod 141 fits slidably through plug 138, spacer 138d, a spring retainer 143 and a stationary plug 144. The spring retainer 143 seats against plug 144 which in turn seats against a shoulder which is formed within bore 137. Seal rings 138a and 144b seal the respective plugs with the bore walls. A spring 142 which is located partially within retainer 143 acts against piston 139 to normally maintain it in the position of FIG. 7.

A stepped indicator knob 145 is secured on the end of rod 141 by a set screw 146. Knob 145 includes an end portion 145a and a body portion 145b which is equal in diameter to bore 137 and which normally projects approximately half way out of the bore. The end portion 145a is reduced in diameter as compared to body portion 145b, and the two portions of the knob are preferably painted to contrast with one another in color.

Figure 10:
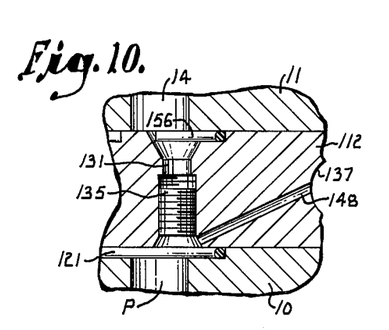
FIG. 10 is a fragmentary cross-sectional view taken generally along line 10—10 of FIG. 7 in the direction of the arrows.

With reference now to FIG. 10 in particular, a small passage 148 leads from the end of passage 131 nearer valve 10 and connects with bore 137. The connection of passage 148 with the bore is located on the opposite side of piston 139 from the connection of passage 136 with the bore. Consequently, the passages apply a pressure differential across the piston in accordance with the pressure differential across screw 135.

Figure 8:
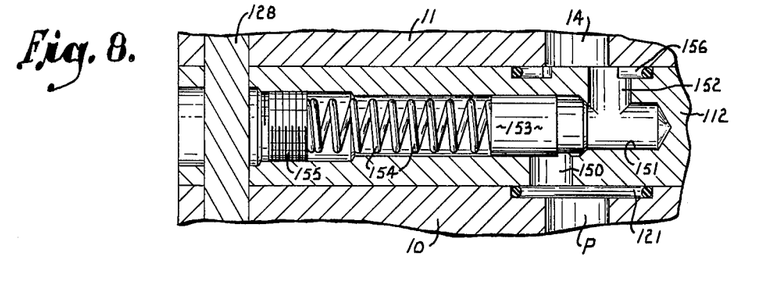
FIG. 8 is a fragmentary cross-sectional view taken generally along line 8—8 of FIG. 7 in the direction of the arrows.

As shown in FIG. 8, a counterbore area within the o-ring 121 that surrounds port P connects with a passage 150 that extends into plate 112. Passage 150 leads to a bore 151 in which a slidable relief valve 153 is contained. Another passage 152 connects with bore 151 at a location offset from passage 150, and valve 153 normally prevents fluid flow between passages 152 and 150. Passages 131 and 152 both open within the o-ring 156 that forms a seal around the passage 14 which connects with the fluid supply.

Valve 153 is normally maintained in its closed position (FIG. 8) by a compression spring 154 which acts against the valve at one end and against a stationary plug 155 at the other end. Plug 155 is threaded into bore 151 and may be adjusted to vary the force that is applied against valve 153 by the spring 154. Valve 153 opens when the fluid pressure in passage 153 overcomes the force of spring 154. Fluid is then able to flow through passages 152 and 150 into the pressure port P of the valve, and the orificed port 131 is thus bypassed. The force exerted on valve 153 by spring 154 is preferably adjusted such that valve 153 opens at a pressure slightly greater than that required to fully retract the indicator knob 145.

With the load leakage indicator plate 112 installed between valve 10 and subplate 11, and with a valve that has been found not to leak significantly, the load can be checked for leakage by shifting the valve spool (not shown) to each of its operating positions and moving the load to the limit of its travel. For example, if the load is a hydraulic cylinder and the valve spool is shifted to connect port P with port A and port B with port T, the fluid passing to the cylinder from port A will cause the cylinder to extend. With the cylinder fully extended and held at its fully extended position, there will ordinarily be no fluid flow. However, if there is leakage in either the load or valve, additional fluid is required to maintain the cylinder in its fully extended position. Since the valve is not leaking, any leakage must be in the load. The additional fluid must flow through passage 14 and into the orificed passage 131.

The restricted orifices 135a in passage 131 cause a pressure differential to develop across screw 135 in proportion to the fluid flow rate, and the pressure differential is applied across piston 139 by passages 136 and 148. This causes the piston to move a distance proportional to the fluid flow rate and thus to the leakage rate in the load. Such movement of the piston causes the indicator knob 145 to retract into plate 112. With proper selection of the effective orifice size in screw 135, the maximum allowable leakage rate can be made to cause full retraction of knob 145 in much the same manner as with the valve leakage detector plate 12. The device actually indicates the combined leakage in the load and valve, but if the valve is prechecked and found not to leak, the entire leakage is attributable to the load.

During normal operation of the valve, the line pressure is applied to passage 152 and is sufficient to open valve 153. Fluid can thus flow into port P from passage 150 as well as from the orificed passage 131, and valve 10 is able to function in a normal manner but at a slightly reduced flow rate and pressure. Since this will cause the load to move at a slightly slower speed than normal, care should be taken against any unsafe conditions that may arise.

The leakage rate in the load can be similarly determined at all operating positions of valve 10 when the load is held at its travel limit. If the load leakage indicator plate 112 is installed under a pilot valve, the leakage rate can be detected in the spool shifting circuit of the slave valve which is controlled by the pilot valve. Since most malfunctions in pilot valve-slave valve combinations result from the inability of the pilot valve to provide fluid at sufficient volume and pressure to shift the slave valve and also supply the leak in the shifting circuit, a good indication of the remaining useful life of the slave valve is given by the leakage rate in its shifting circuit.

Each of the leakage indicator plates 12 and 112 will be carried and stored between a pair of flat plates (not shown), one of which will have a carrying handle. One or both of these flat carrying plates will be drilled to receive the elongate mounting screws 28 and 128 which are used to attach the indicator plates to the valve and which are long enough to accomodate the additional thickness presented by the indicator plates.

From the foregoing, it will be seen that this invention is one well adapted to attain all the ends and objects hereinabove set forth, together with the other advantages which are obvious and which are inherent to the structure.

It will be understood that certain features and subcombinations are of utility and may be employed without reference to other features and subcombinations. This is contemplated by and is within the scope of the claims.

Since many possible embodiments may be made of the invention without departing from the scope thereof, it is to be understood that all matter herein set forth or shown in the accompanying drawings is to be interpreted as illustrative and not in a limiting sense.

Having thus described the invention, I claim:

1. A device for detecting fluid leakage in a valve having a supply port for receiving fluid from a fluid source, at least one load port for directing fluid to and from a load, a tank port for directing fluid to a reservoir, and a shiftable valve element for connecting and disconnecting selected valve ports to and from one another, said device comprising:

a housing adapted to be detachable coupled with the valve;

a first passage presented through said housing, said first passage providing communication between said fluid source and supply port when said housing is coupled with the valve;

a second passage presented through said housing, said second passage providing communication between said tank port and reservoir when said housing is coupled with the valve;

means on said housing for blocking said load port to prevent fluid from passing therethrough when said housing is coupled with the valve; and detecting means associated with said housing for detecting fluid flowing into said second passage when said supply and load ports are connected with one another and said supply and tank ports are disconnected from one another.

2. The device of claim 1, wherein said second passage includes a restricted area orifice which develops a pressure differential thereacross proportional to the rate of fluid flow into said second passage, said detecting means being operable to indicate the extent of the pressure differential across said orifice, thereby providing an indication of the rate of fluid leakage from the valve.

3. The device of claim 2, wherein said detecting means includes:

a piston member disposed in said housing for sliding movement and having a stable position, said piston member presenting opposite first and second sides;

a first passageway in said housing extending from the side of said orifice nearer said tank port to the first side of said piston member;

a second passageway in said housing extending from the side of said orifice farther from said tank port to the second side of said piston, whereby the pressure differential across said orifice is applied across said piston member between the first and second sides thereof to effect sliding movement of said piston member away from its stable position; and means providing an indication of the distance of said piston member away from its stable position.

4. The device of claim 1, wherein said detecting means includes:

a piston member disposed in said housing for sliding movement and having a stable position; and means effecting movement of said piston member away from its stable position a distance proportional to the rate of fluid flow from said tank port, thereby providing an indication of the fluid leakage rate from the valve.

5. The device of claim 4, including an indicator knob coupled with said piston member for movement therewith, said knob having an end of stepped configuration projecting out of said housing to provide a tactile indication of the distance of said piston member away from its stable position.

6. The device of claim 1, including a plurality of interchangeable orificed members each adapted to be disposed in said second passage and each presenting an orifice having an effective size different from the orifices in the remaining members, each orifice being operable to develop a pressure differential thereacross proportional to the rate of fluid flow into said second passage, said detecting means being operable to indicate the extent of the pressure differential across the orifice disposed in said second passage.

7. The device of claim 1, including:

a third passage presented through said housing, said third passage providing a fluid path between said tank port and reservoir which bypasses said second passage when said housing is coupled with the valve; and valve means operable to open said third passage when the fluid pressure at said tank port exceeds a preselected level and to close said third passage when the fluid pressure at said tank port is below said preselected level.

8. A method of detecting fluid leakage in a valve having a supply port for receiving fluid from a fluid source, at least one load port for directing fluid to and from a load, a tank port for directing fluid to a reservoir, and a shiftable valve element for connecting and disconnecting selected valve ports to and from one another, said method comprising the steps of:
coupling said supply port with the fluid source to deliver fluid into the valve;
shifting the valve element in a manner to connect said supply port with said load port and to disconnect said supply port from said tank port;
blocking said load port to prevent fluid from passing out of the valve therethrough;
detecting fluid flow out of said tank port, thereby detecting fluid leakage in the valve;
directing the fluid from said tank port through a restricted area orifice to develop a pressure differential across the orifice proportional to the rate at which fluid flows out of said tank port;
sensing the magnitude of said pressure differential to thereby provide an indication of the rate of fluid leakage in the valve;
providing a fluid path from said tank port which bypasses said orifice;
closing said fluid path to flow when the pressure differential is below a preselected value; and
opening said fluid path to flow when the pressure differential is above said preselected value, thereby reducing the pressure differential.

9. The method of claim 8, including the step of measuring the rate at which fluid flows out of said tank port to thereby ascertain the rate of fluid leakage in the valve.

10. The method of claim 8, wherein said sensing step comprises:
applying said pressure differential across a movable piston member to effect movement of same a distance proportional to the pressure differential; and
measuring the distance of movement of said piston member.

11. A device for detecting the combined fluid leakage in a fluid-controlled load which has a limited travel and a valve having a supply port for receiving fluid from a fluid source, at least one load port for directing fluid to and from the load, a tank port for directing fluid to a reservoir, and a shiftable valve element for connecting and disconnecting selected valve ports, said device comprising:
a housing adapted to be coupled with the valve intermediate said valve and load;
a first passage presented through said housing, said first passage providing communication between said fluid source and supply port when said housing is coupled with the valve;
a second passage presented through said housing, said second passage providing communication between said tank port and reservoir when said housing is coupled with the valve;
a third passage presented through said housing, said third passage providing communication between said load port and load when said housing is coupled with the valve;
a restricted area orifice disposed in said first passage to develop a pressure differential thereacross proportional to the rate of fluid flow through said first passage; and
detecting means associated with said housing for detecting the pressure differential across the orifice of said first passage to provide an indication of the rate of fluid leakage from said load and valve when said supply and load ports are connected with one another and said load is at its travel limit.

12. The device of claim 11, wherein said detecting means includes:
a piston member disposed in said housing for sliding movement and having a stable position, said piston member presenting opposite first and second sides;
a first passageway in said housing extending from the side of said orifice nearer said supply port to the first side of said piston member;
a second passageway in said housing extending from the side of said orifice farther from said supply port to the second side of said piston, whereby the pressure differential across said orifice is applied across said piston member between the first and second sides thereof to effect sliding movement of said piston member away from its stable position; and
means providing an indication of the distance of said piston member away from its stable position.

13. The device of claim 11, wherein said detecting means includes:
a piston member disposed in said housing for sliding movement and having a stable position; and
means effecting movement of said piston member away from its stable position a distance proportional to the rate of fluid flow through said first passage, thereby providing an indication of the fluid leakage rate from said load and valve.

14. The device of claim 13, including an indicator knob coupled with said piston member for movement therewith, said knob having an end of stepped configuration projecting out of said housing to provide a tactile indication of the distance of said piston member away from its stable position.

15. The device of claim 11, including a plurality of interchangeable orificed members each adapted to be disposed in said first passage and each presenting an orifice having an effective size different from the orifices in the remaining members, each orifice being operable to develop a pressure differential thereacross proportional to the rate of fluid flow through said first passage, said detecting means being operable to indicate the extent of the pressure differential across the orifice disposed in said first passage.

16. The device of claim 11, including:
a fourth passage presented through said housing, said fourth passage providing a fluid path between said fluid source and supply port which bypasses said first passage when said housing is coupled with the valve; and
valve means operable to open said fourth passage when the fluid pressure in said first exceeds a preselected level and to close said fourth passage when the fluid pressure in said first passage is below said preselected level.

17. A method of detecting the combined fluid leakage in fluid-controlled load which has a limited travel and a valve having a supply port for receiving fluid from a fluid source, at least one load port for directing fluid to and from the load, a tank port for directing fluid to a reservoir, and a shiftable valve element for connecting and disconnecting selected valve ports to and from one another, said method comprising the steps of:
- coupling said supply port with the fluid source to deliver fluid into the valve;
- coupling said load port with said load;
- shifting the valve activator in a manner to connect said supply port with said load port;
- moving the load to its travel limit;
- detecting fluid flow into said supply port with said load disposed at its travel limit, thereby detecting the combined fluid leakage in the load and valve;
- directing the fluid from the fluid source through a restricted area orifice disposed between said source and supply port to develop a pressure differential across the orifice proportional to the rate at which fluid flows into said supply port; and
- sensing the magnitude of said pressure differential to thereby provide an indication of the rate of fluid leakage in the load and valve.

18. The method of claim 17, including the step of measuring the rate at which fluid flows into said supply port to thereby ascertain the rate of fluid leakage in said load and valve.

19. The method of claim 17, wherein said sensing step comprises:
- applying said pressure differential across a movable piston member to effect movement of same a distance proportional to the pressure differential; and
- measuring the distance of movement of said piston member.

20. The method of claim 17, including the steps of:
- providing a fluid path from said fluid source to said supply port which bypasses said orifice;
- closing said fluid path to flow when the pressure differential across said orifice is below a preselected level; and
- opening said fluid path to flow when said pressure differential is above said preselected level.

* * * * *